United States Patent [19]

Kohl et al.

[11] Patent Number: 4,888,368

[45] Date of Patent: Dec. 19, 1989

[54] METHOD OF INHIBITING THE DISCOLORATION OF EMULSIONS AND DISCOLORATION RESISTANT EMULSION COMPOSITIONS

[75] Inventors: Gretchen S. Kohl, Midland; James McGee, Sanford, both of Mich.

[73] Assignee: Dow Corning Corporation, Midland, Mich.

[21] Appl. No.: 193,465

[22] Filed: May 12, 1988

[51] Int. Cl.$^4$ ................................................. C08K 5/34
[52] U.S. Cl. ................................. 524/92; 106/287.11; 106/287.13; 524/102; 524/417; 524/706
[58] Field of Search ................. 106/287.11, 287.13; 524/417, 706, 102, 92

[56] References Cited

U.S. PATENT DOCUMENTS

| | | | |
|---|---|---|---|
| 2,163,984 | 2/1938 | Petkovic | 524/417 |
| 2,495,141 | 1/1950 | Schmidt | 524/417 |
| 2,868,765 | 1/1959 | Haefner et al. | 524/417 |
| 4,014,710 | 3/1977 | Woditsch et al. | 106/304 |
| 4,340,518 | 7/1982 | Nolte et al. | 524/417 |
| 4,377,608 | 3/1983 | Daudt et al. | 427/350 |
| 4,377,675 | 3/1983 | Daudt et al. | 528/25 |
| 4,400,326 | 8/1983 | Daudt et al. | 260/429 |
| 4,404,196 | 9/1983 | Daudt et al. | 424/184 |
| 4,404,306 | 9/1983 | Daudt et al. | 524/262 |
| 4,435,219 | 3/1984 | Greigger | 524/417 |
| 4,668,507 | 5/1987 | Tomkins et al. | 424/45 |

OTHER PUBLICATIONS

A Review Of Corrosion Inhibitors by R. T. White *Corrosion And Coatings South Africa*, Oct. 1986, pp. 4, 6 & 10.

*Primary Examiner*—Melvyn I. Marquis
*Attorney, Agent, or Firm*—Marc C. Pawl

[57] ABSTRACT

This invention relates to a method and composition for inhibiting discoloration of the emulsions due to contact with ferrous materials. The invention comprises adding from 0.1 to 1.6 wt. %, preferably, from 0.3 to 0.9 wt. % based on the oil phase of the emulsion of one or more members of the group consisting of phosphoric acid and disodium phosphate. The invention also optionally comprises an amount of pit corrosion inhibitor selected from the group consisting of zinc pyrithione and a zinc containing siloxane resin. The invention also includes the composition of a silicone polymer in water emulsion, wherein the emulsion contains form 0.1 to 1.6 wt%, preferably, from 0.3 to 0.9 wt. % based on the oil phase of the emulsion of one or more mebers of the group consisting of phosphoric acid and disodium phosphate and optionally comprises an amount of pit corrosion inhibitor.

11 Claims, No Drawings

4,888,368

METHOD OF INHIBITING THE DISCOLORATION OF EMULSIONS AND DISCOLORATION RESISTANT EMULSION COMPOSITIONS

BACKGROUND OF THE INVENTION

This invention relates to a method of inhibiting the discoloration of emulsions due to contact with ferrous metals and ions of ferrous metals and compositions of emulsions which are resistant to such discoloration.

The inventors and others have noted that emulsions, and particularly, silicone containing emulsions, sometimes discolor, changing from their normal white color to yellow, brown or pinkish hues. This discoloration is considered to be very unsatisfactory by consumers of these products who value emulsions having a clean white color.

It was traditionally believed that this type of discoloration was due to a bloom, or increased growth, of microorganisms in the emulsion. To determine if microorganisms cause the discoloration, four samples of amino substituted polydimethyl siloxane oil in water emulsions were obtained from different sources for testing. Color observations and microorganism counts were made on the four samples as received. The results of the observations and counts are reported below.

TABLE 1

| SAMPLE | COLOR | ORGANISM COUNT |
| --- | --- | --- |
| Sample A | white | $2.5 \times 10^6$ cfu/ml |
| Sample B | very pink | $3.1 \times 10^6$ cfu/ml |
| Sample C | pink | $1.4 \times 10^6$ cfu/ml |
| Sample D | very pink | $>3.0 \times 10^6$ cfu/ml | cfu = colony forming units

Testing indicated no apparent correlation between emulsion color and the number of microorganisms present in the samples. For example, Sample A was white in color and had a microorganism count nearly twice as high as that of pink hued Sample C.

Other inquiries were made which led to the postulation that the discoloration of the emulsion was due to contact with ferrous metals or ions of ferrous metals. Tests were conducted to compare the iron content of both white and discolored samples of silicone emulsions. A Milton Roy Spectro Kit for Soluble Iron Analysis, commercially available from Milton Roy Company, Rochester, N.Y., was used to determine soluble iron presence in emulsion samples. The analysis kit utilizes 1,10-phenanthroline as a colormetric indicator. It was found that discolored emulsion samples tested positive for soluble iron content while samples of white emulsions tested negative for soluble iron content.

In an experiment designed to intentionally discolor a white emulsion, a portion of Sample E was diluted with deionized water to obtain a 1% solids concentration of the emulsion. A coupon of 1018 mild steel, slightly smaller in size than a dime, was first rubbed clean with 4/0 coarseness emery paper, and then rinsed successively with 95% methanol then distilled water. The coupon was then placed in a closed bottle containing an amount of clean, white emulsion and the effect of the interaction between the ferrous metal and emulsion was observed over a two day period. At the end of the first day of contact, both the emulsion and steel coupon showed signs of deterioration. The emulsion had turned a yellow-brown color and a ring of red-brown precipitate, presumably an iron oxide, had formed in the bottom of the container around the coupon. At the end of two days of observation the emulsion had turned brown and the coupon itself had become very discolored from oxidation.

It was recognized that sources of iron which could cause discoloration of emulsions are numerous. Some possible sources of iron include the soluble iron found in the water used in formulating emulsion compositions or finished products, ferrous metals present in emulsion processing equipment and the containers in which the emulsions are transported and stored, especially the bung hole covers of drums or barrels.

A way was sought to prevent the discoloration of emulsions which come in contact with ferrous metals. It was discovered that the addition of phosphate ions, particularly amounts of one or more members of the group consisting of phosphoric acid and disodium phosphate to the emulsion prevented discoloration in the presence of ferrous metals and ions of ferrous metals.

It was found that the further addition of amounts of one or more members of the group consisting of zinc pyrithione and a resin comprising zinc oxide, ammonia and siloxane, acted to inhibit the pitting corrosion of ferrous materials often associated with phosphate contact at low pH levels. It was also found that the zinc pyrithione and zinc containing resin have the added benefit of controlling microbiological activity in emulsions.

U.S. Pat. No. 4,668,507 relates to additives for inhibiting pitting corrosion of metallic containers in which insecticide emulsions are sold. Disodium phosphate is disclosed as one additive component.

SUMMARY OF THE INVENTION

The present invention relates to a method of inhibiting emulsion discoloration due to contact with ferrous metals and ions of ferrous metals by adding phosphate ions to the emulsion. In another embodiment of the invention, zinc containing materials are also added to control the corrosion of metals with which the emulsion has contact.

The invention has utility with essentially all emulsions: from milk to silicone and water emulsions, including mechanical emulsions, polymerization emulsions and microemulsions. Some emulsions in which the invention has very high utility are silicone polymer emulsions, such as dimethyl siloxane polymer in water emulsions, and amino functional dimethyl siloxane polymer in water emulsions, like amodimethicone and water emulsions.

DETAILED DESCRIPTION OF THE INVENTION

The invention comprises adding phosphate ions to an emulsion, the phosphate ions being obtained particularly from the addition of one or more discoloration inhibitors selected from the group consisting of phosphoric acid and disodium phosphate. The amount of discoloration inhibitor present in the emulsion ranges from 0.1 to 1.6 wt.%, and preferably, from 0.3 to 0.9 wt.% based on the oil phase of the emulsion.

The invention may further comprise from 10 to 10,000 ppm, in terms of the emulsion itself, of one or more members of the group consisting of zinc pyrithione and a metal containing resin disclosed in U.S. Pat. Nos. 4,377,608; 4,377,675; 4,400,326; 4,404,196 and 4,404,306, which are incorporated herein by reference.

The metal containing resin is described as an aqueous metal amine siliconate solution comprising the reaction products of:

(a) a metal, metal derivative or a mixture thereof which dissolves in the reaction mixture to yield metal ammine cations in the presence of R—NH$_2$;

(b) R—NH$_2$ where R is H, aminoalkyls with 2–6 carbon atoms, or mixtures thereof and wherein the —NH$_2$ molar concentration is equal to at least n times the molar concentration of the metal or metal derivative where n is the coordination number of the metal;

(c) a mono-organosilicon material which can undergo hydrolysis in the presence of the other reactants to yield mono-organosilanols or siloxanols and hydrolysis products which are not more acidic than the silanols or siloxanols wherein the organo moiety in the mono-organosilicon material contains up to about 50 carbon atoms and is selected from the group consisting of saturated and unsaturated hydrocarbons having from 1 to about 6 carbon atoms, halohydrocarbons having up to 6 carbon atoms and wherein the halo substitution is at a location other than the alpha or beta locations, aminohydrocarbons, radicals containing one or more ether or thioether linkages, hydroxyfunctional alkyl radicals, carbomethoxyalkyl radicals, carbamoylalkoxy radicals, quaternary ammonium or phosphonium bearing alkyl radicals and mixtures thereof, the mono-organosilicon material being present in an amount sufficient to yield a silicon/metal ratio of from about 1 to about 10; and (d) water.

In a second embodiment of the invention, the zinc pyrithione/metal containing resin content ranges from 10 to 2,500 ppm. In yet a third embodiment of the invention, the zinc pyrithione/metal containing resin content ranges from 10 to 1,000 ppm.

The invention also includes a composition comprising a silicon polymer in water emulsion, wherein the polymer is amodimethicone, as described below, and from 0.1 to 1.6 wt.%, preferably, from 0.3 to 0.9 wt.% based on the oil phase of the emulsion of a discoloration inhibitor selected from the group consisting of phosphoric acid and disodium phosphate. The emulsion composition invention may further comprise from 10 to 1,000 ppm, in terms of the emulsion itself, of one or more members of the group consisting of zinc pyrithione and the zinc containing resin.

PREPARATION AND TESTING OF SAMPLES 1–8

Experiments were carried out to determine the suitability of materials as additives for inhibiting the discoloration of the emulsion and also for inhibiting the corrosion and deterioration of ferrous metals the emulsions come in contact with. An emulsion containing water and a silicone polymer end blocked with amino functional groups was used as the test emulsion. The silicone polymer of the test emulsion has the common name of amodimethicone and is represented by the formula:

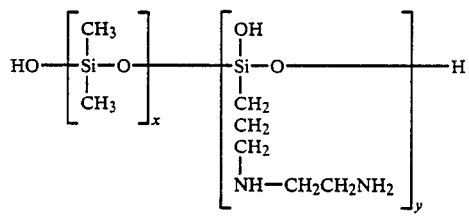

wherein x is in the range of from 500 to 520 and y is in the range of from 2–2.3.

Individual samples were prepared for testing by diluting the emulsion (Standard Emulsion) with water and adding other materials, as indicated below.

Portions of the Standard Emulsion described above were modified as follows:

SAMPLE 1

2.8 g of the Standard Emulsion was diluted with 97.2 g of tap water. Sample 1 was calculated to contain 1.28 g of oil phase and the pH of the sample was determined to be 6.43.

SAMPLE 2

100 g of the Standard Emulsion was combined with 1.2 g of phosphoric acid (17.5% aqueous solution). The sample was calculated to contain 43.99 g oil phase and the pH was determined to be 5.23.

SAMPLE 3

100 g of the Standard Emulsion was combined with 1.0 g citric acid (17.5% aqueous solution). Sample 3 was calculated to contain 43.99 g of the oil phase and the pH of the sample was 5.14.

SAMPLE 4

100 g of the Standard Emulsion was combined with 1.2 g acetic acid (17.5% aqueous solution). The sample was calculated to contain 43.99 g of the oil phase and the pH of the sample was found to be 5.26.

SAMPLE 5

2.8 g of Sample 2 was diluted with 97.2 g tap water. Sample 5 was calculated to contain 1.23 g of the oil phase of the emulsion and the pH of the sample was found to be 5.26.

SAMPLE 6

2.8 g of Sample 2 were diluted with 97.2 g of deionized water. Sample 6 was calculated to contain 1.23 g of the oil phase and the pH of the sample was found to be 5.26.

SAMPLE 7

2.8 g of Sample 3 were diluted with 97.2 g of tap water. The sample was calculated to contain 1.28 g of the oil phase and the pH of the sample was found to be 5.14.

SAMPLE 8

2.8 g of Sample 4 were diluted with 97.2 g of tap water. The sample was calculated to contain 1.28 g of the oil phase and the pH of the sample was found to be 5.23.

Comparative tests were then carried out to determine the ability of the various samples to resist discoloration.

The tests were carried out by placing portions of Samples 1, and 5-8 in containers with approximately dime-sized coupons of 1018 mild steel and observing the contents of the containers after the passage of a 24 hour period. The results are reported below in TABLE 2.

| sample number | inhibitor in oil phase | observations after standing 24 hours |
| --- | --- | --- |
| Sample 1 (tap water dilution) | 0 | emulsion discolored no corrosion of coupon ring around coupon |
| Sample 5 (phosphoric acid and tap water) | .48 wt. % | emulsion remained white coupon clean slight ring around coupon |
| Sample 6 (phosphoric acid and deionized water) | .48 wt. % | emulsion remained white coupon clean |
| Sample 7 (citric acid and tap water) | .40 wt. % | emulsion slightly discolored coupon corroded ring around coupon |
| Sample 8 (acetic acid and tap water) | .48 wt. % | emulsion discolored extensive coupon corrosion ring around coupon |

It can be seen from the testing of the Samples above that the addition of phosphoric acid to the emulsion was highly effective in inhibiting discoloration of the emulsion and also in inhibiting corrosion of the ferrous metal the emulsion has contact with.

Adding phosphoric acid to emulsions containing amodimethicone also had the unexpected effect of reducing or eliminating the odor sometimes associated with the presence of the amine constituents of the emulsion's surfactants. This odor is unpleasant, resembling that of dead fish, and renders the material unsatisfactory for use in cosmetic compositions without the further addition of a masking fragrance. It was noted that the fishy odor was eliminated as the pH of the emulsion dropped when phosphoric acid was added thereto.

While it was found that phosphoric acid inhibited the discoloration of the emulsion, a microscopic examination of the coupons tested in Samples 1, 5, 6, 7, and 8 revealed that the presence of phosphoric acid in the emulsion has the drawback of promoting pit corrosion of the ferrous metal coupons, especially at pH levels below 6.

In an article entitled "A Review of Corrosion Inhibitors II" found in the publication *Corrosion and Coatings South Africa*, October 1986, zinc salts are disclosed as being good inhibitors of pit corrosion. The inventors found a particular zinc salt, zinc pyrithione, with the structure:

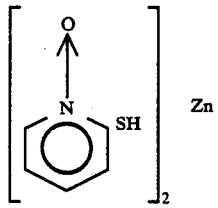

to be an effective pit corrosion inhibitor in the emulsions of the invention.

In addition to being an effective pit corrosion inhibitor, zinc pyrithione has other beneficial effects, such as being a biocide for gram negative and gram positive bacteria, yeasts and molds, and also fungi. The biocidal activity is especially valued since it is known that emulsions can provide habitats for microorganisms. Zinc pyrithione is commercially available as a 48% dispersion in water under the trade name Zinc Omadine, from Olin Corporation Chemicals Division, Stamford, Conn.

Another suitable zinc containing material was tested and found to be effective in inhibiting pit corrosion of the coupons. This material is a zinc oxide containing resin comprising zinc oxide, ammonia and siloxane monomer. This resin is fully disclosed in U.S. Pat. Nos. 4,400,326, 4,404,306, 4,377,675, 4,404,196 and 4,377,608 which are incorporated herein by reference to show the compositions and their preparations.

What is claimed is:

1. A method of inhibiting discoloration of silicone aqueous emulsions due to contact with ferrous materials comprising the addition to the emulsion of from 0.1 to 1.6 wt.%, based on the oil phase of the emulsion, of one or more members selected from the group consisting of phosphoric acid and disodium phosphate.

2. A method of inhibiting discoloration of emulsions as claimed in claim 1, wherein from 0.3 to 0.9 wt.% of one or more members selected from the group consisting of phosphoric acid and disodium phosphate is added to said emulsion.

3. An emulsion composition resistant to discoloration from contact with ferrous metals comprising water and a silicone polymer of the formula:

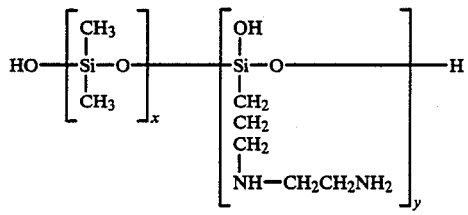

wherein x is in the range of from 500 to 520 and y is in the range of from 2-2.3, wherein one or more discoloration inhibitors selected from the group consisting of phosphoric acid and disodium phosphate is contained therein in an amount of from 0.1 to 1.6 wt.%, based on the oil phase of the emulsion.

4. A composition as claimed in claim 3, wherein the discoloration inhibitor is contained therein in an amount from 0.3 to 0.9 wt.%.

5. A composition as claimed in claim 3, wherein the composition further comprises from 10 to 10,000 ppm of one or more members of pit corrosion inhibitors selected from the group consisting of zinc pyrithione and an aqueous metal ammine siliconate solution comprising the reaction products of:
(a) a metal, metal derivative or a mixture thereof which dissolves in the reaction mixutre to yield metal ammine cations in the presence of R—NH$_2$;
(b) R—NH$_2$ where R is H, aminoalkyls with 2-6 carbon atoms, or mixtures thereof and wherein the —NH$_2$ molar concentration is equal to at least n times the molar concentration of the metal or metal derivative where n is the coordination number of the metal;
(c) a mono-organosilicon material which can undergo hydrolysis in the presence of the other reactants to yield mono-organosilanols or siloxanols and hydrolysis products which are not more acidic than the silanols or siloxanols wherein the organo moiety in the mono-organosilicon material contains up to about 50 carbon atoms and is selected from the group consisting of saturated and unsaturated hydrocarbons having from 1 to about 6 carbon atoms, halohydrocarbons having up to 6 carbon atoms and wherein the halo substitution is at a location other than the alpha or beta locations, aminohydrocarbons, radicals containing one or more ether or thioether linkages, hydroxyfunctional alkyl radicals, carbomethoxyalkyl radicals, carbamoylaykoxy radicals, quaternary ammonium and phosphonium bearing alkyl radicals and mixtures thereof, the mono-organosilicon material being present in an amount sufficient to yield a silicon/-metal ratio of from about 1 to about 10; and (d) water.

6. A composition as claimed in claim 4, wherein the composition further comprises from 10 to 10,000 ppm of one or more members of pit corrosion inhibitors selected from the group consisting of zinc pyrithione and an aqueous metal ammine siliconate solution comprising the reaction products of:

(a) a metal, metal derivative or a mixture thereof which dissolves in the reaction mixture to yield metal ammine cations in the presence of R—NH$_2$;

(b) R-NH$_2$ where R is H, aminoalkyls with 2-6 carbon atoms, or mixtures thereof and wherein the —NH$_2$ molar concentration is equal to at least n times the molar concentration of the metal or metal derivative where n is the coordination number of the metal;

(c) a mono-organosilicon material which can undergo hydrolysis in the presence of the other reactants to yield mono-organosilanols or siloxanols and hydrolysis products which are not more acidic than the silanols or siloxanols wherein the organo moiety in the mono-organosilicon material contains up to about 50 carbon atoms and is selected from the group consisting of saturated and unsaturated hydrocarbons having from 1 to about 6 carbon atoms, halohydrocarbons having up to 6 carbon atoms and wherein the halo substitution is at a location other than the alpha or beta locations, aminohydrocarbons, radicals containing one or more ether or thioether linkages, hydroxyfunctional alkyl radicals, carbomethoxyalkyl radicals, carbamoylalkoxy radicals, quaternary ammonium and phosphonium bearing alkyl radicals and mixtures thereof, the mono-organosilicon material being present in an amount sufficient to yield a silicon/metal ratio of from about 1 to about 10; and (d) water.

7. A method of inhibiting discoloration of silicone aqueous emulsions due to contact with ferrous materials, as claimed in claim 1, wherein said aqueous emulsions are selected from the group consisting of dimethyl siloxane polymer in water emulsions and amino functional dimethyl siloxane polymer in water emulsions.

8. A method of inhibiting discoloration of silicone aqueous emulsions due to contact with ferrous materials comprising the addition to the emulsion of from 0.1 to 1.6 wt.%, based on the oil phase of the emulsion, of one or more members selected from the group consisting of phosphoric acid and disodium phosphate, wherein additionally, from 10 to 10,000 ppm of one or more members of pit corrosion inhibitors selected from the group consisting of zinc pyrithione and an aqueous metal amine siliconate solution comprising the reaction products of:

(a) a metal, metal derivative or a mixture thereof which dissolves in the reaction mixture to yield metal ammine cations in the presence of R-NH$_2$;

(b) R-NH$_2$ where R is H, aminoalkyls with 2-6 carbon atoms, or a mixture thereof and wherein the —NH$_2$ molar concentration is equal to at least n times the molar concentration of the metal or metal derivative where n is the coordination number of the metal;

(c) a mono-organosilicon material which can undergo hydrolysis in the presence of the other reactants to yield mono-organosilanols or siloxanols and hydrolysis products which are not more acidic than the silanols or siloxanols wherein the organo moiety in the mono-organosilicon material contains up to about 50 carbon atoms and is selected from the group consisting of saturated and unsaturated hydrocarbons having from 1 to about 6 carbon atoms, halohydrocarbons having up to 6 carbon atoms and wherein the halo substitution is at a location other than the alpha or beta locations, aminohydrocarbons, radicals containing one or more ether or thioether linkages, hydroxyfunctional alkyl radicals, carbomethoxyalkyl radicals, carbomoylalkoxy radicals, quaternary ammonium and phosphonium bearing alkyl radicals and mixtures thereof, the mono-organosilicon material being present in an amount sufficient to yield a silicon/metal ratio of from about 1 to about 10; and (d) water are added to said emulsion.

9. A method of inhibiting discoloration of silicone aqueous emulsions due to contact with ferrous materials comprising the addition to the emulsion of from 0.3 to 0.9 wt.%, based on the oil phase of the emulsion, of one or more members selected from the group consisting of phosphoric acid and disodium phosphate, wherein additionally, from 10 to 10,000 ppm of one or more members of pit corrosion inhibitors selected from the group consisting of zinc pyrithione and an aqueous metal ammine siliconate solution comprising the reaction products of:

(a) a metal, metal derivative or a mixture thereof which dissolves in the reaction mixture to yield metal ammine cations in the presence of R—NH$_2$;

(b) R—NH$_2$ where R is H, aminoalkyls with 2-6 carbon atoms, or a mixture thereof and wherein the —NH$_2$ molar concentration is equal to at least n times the molar concentration of the metal or metal derivative where n is the coordination number of the metal;

(c) a mono-organosilicon material which can undergo hydrolysis in the presence of the other reactants to yield mono-organosilanols or siloxanols and hydrolysis products which are not more acidic than the silanols or siloxanols wherein the organo moiety in the mono-organosilicion material contains up to about 50 carbon atoms and is selected from the group consisting of saturated and unsaturated hydrocarbons having from 1 to about 6 carbon atoms, halohydrocarbons having up to 6 carbon atoms and wherein the halo substitution is at a location other than the alpha or beta locations, aminohydrocarbons, radicals containing one or more ether or thioether linkages, hydroxyfunctional alkyl radicals, carbomethoxyalkyl radicals, carbamoylalkoxy radicals, quaternary ammonium and phosphonium bearing alkyl radicals and mixtures thereof, the mono-organosilicon material being present in an amount sufficient to yield a silicon/metal ratio of from about 1 to about 10; and (d) water are added to said emulsion.

10. A method of inhibiting discoloration of silicone aqueous emulsions due to contact with ferrous materials, as claimed in claim 8, wherein said aqueous emulsions are selected from the group consisting of dimethyl siloxane polymer in water emulsions and amino functional dimethyl siloxane polymer in water emulsions.

11. A method of inhibiting discoloration of silicone aqueous emulsions due to contact with ferrous materials, as claimed in claim 9, wherein said aqueous emulsions are selected from the group consisting of dimethyl siloxane polymer in water emulsions and amino functional dimethyl siloxane polymer in water emulsions.

* * * * *